United States Patent
Le Chevalier et al.

(10) Patent No.: US 9,489,355 B2
(45) Date of Patent: Nov. 8, 2016

(54) CHARACTERIZATION OF LAYERED DOCUMENTS IN HTML5 PUBLISHING

(75) Inventors: Vincent Le Chevalier, San Jose, CA (US); Charles F. Geiger, San Jose, CA (US); Pierce Trowbridge Wetter, III, Santa Clara, CA (US); Ashit Joshi, San Jose, CA (US); Ohad Eder-Pressman, San Francisco, CA (US); Brent S. Tworetzky, Palo Alto, CA (US); Dax Eckenberg, Los Gatos, CA (US); Rahul Ravindra Mutalik Desai, San Jose, CA (US)

(73) Assignee: Chegg, Inc., Santa Clara, CA (US)

( * ) Notice: Subject to any disclaimer, the term of this patent is extended or adjusted under 35 U.S.C. 154(b) by 678 days.

(21) Appl. No.: 13/542,249

(22) Filed: Jul. 5, 2012

(65) Prior Publication Data
US 2014/0012685 A1    Jan. 9, 2014

(51) Int. Cl.
*G06F 17/22* (2006.01)
*G06F 17/21* (2006.01)
*G06Q 30/02* (2012.01)
*G06F 17/24* (2006.01)

(52) U.S. Cl.
CPC ......... *G06F 17/2247* (2013.01); *G06F 17/217* (2013.01); *G06F 17/241* (2013.01); *G06Q 30/02* (2013.01)

(58) Field of Classification Search
CPC ... G06Q 30/02; G06F 17/241; G06F 17/217; G06F 17/2247
USPC .................................................. 715/234, 201
See application file for complete search history.

(56) References Cited

U.S. PATENT DOCUMENTS

| | | | |
|---|---|---|---|
| 2006/0149726 A1* | 7/2006 | Ziegert | G06F 17/30905 |
| 2008/0025315 A1* | 1/2008 | Elzur | H04L 29/06217 370/394 |
| 2011/0145287 A1* | 6/2011 | Jiang et al. | 707/780 |
| 2011/0213655 A1* | 9/2011 | Henkin et al. | 705/14.49 |
| 2012/0166290 A1* | 6/2012 | Reis | G06Q 30/0269 705/14.66 |
| 2012/0240183 A1* | 9/2012 | Sinha | H04W 12/08 726/1 |
| 2012/0266057 A1* | 10/2012 | Block | G06Q 30/0277 715/202 |
| 2013/0091521 A1* | 4/2013 | Phillips | H04N 21/23424 725/35 |
| 2013/0174011 A1* | 7/2013 | Le Chevalier et al. | 715/234 |
| 2013/0174016 A1* | 7/2013 | Glazer et al. | 715/234 |
| 2013/0262978 A1* | 10/2013 | Reshadi | G06F 17/272 715/234 |
| 2013/0311870 A1* | 11/2013 | Worsley et al. | 715/234 |

OTHER PUBLICATIONS

W3C, HTML5 2008, http://www.w3.org/TR/2008/WD-html5-20080122/.*

* cited by examiner

*Primary Examiner* — Maikhanh Nguyen
(74) *Attorney, Agent, or Firm* — Fenwick & West LLP

(57) ABSTRACT

An education digital reading platform provides pages of a document requested by a user, the pages including additional content layers associated with the requested content. The additional content layers including related content, user generated content, advertisement content and other services content offered by the digital reading platform. The requested content and additional content layers require processing capability on a web browser application. The amount of data associated with a page of a document may vary dramatically especially considering the additional layers of content associated with the pages. In order to permit the web browser application anticipate the processing needs associated with each page, the digital reading platform provides markers indicating a difference in processing requirements associated between two pages of a document. The markers enable the web browser request additional resources to provide a seamless user experience or enable the web browser application to request additional or fewer content layers.

21 Claims, 7 Drawing Sheets

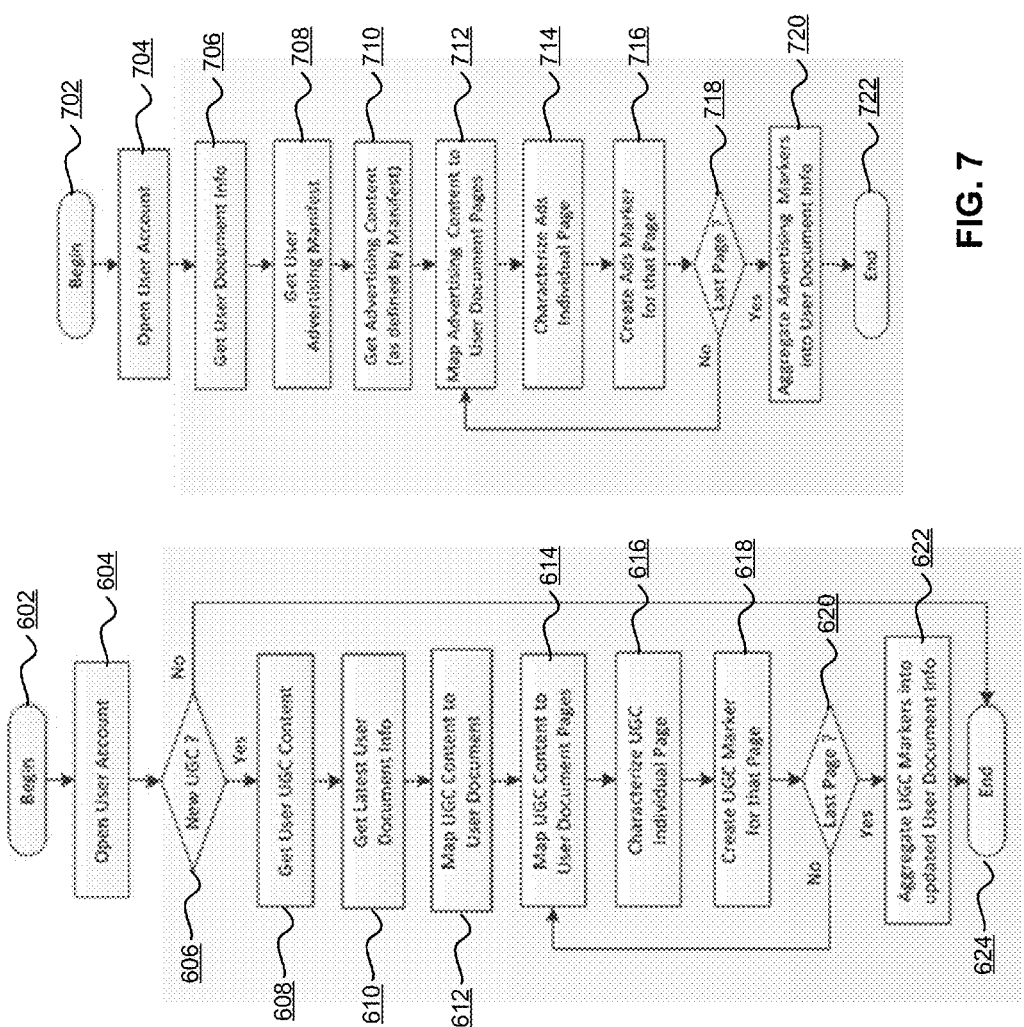

CHARACTERIZATION OF LAYERED DOCUMENTS IN HTML5 PUBLISHING

CROSS REFERENCE TO RELATED APPLICATIONS

This application is related to U.S. Utility application Ser. No. 13/253,011, which is incorporated by reference in its entirety.

BACKGROUND

1. Field of the Invention

This invention relates to characterizing documents published in HTML5 format and provided by an educational platform.

2. Description of the Related Art

The successes of commercially deployed devices offering electronic book content and services provide an indication that readers at large were ready to migrate from print to digital content. Furthermore, consumer adoption has been validated across a wide distribution of gender, age and geography as this shift accelerated all around the world.

From a technical perspective, this commercial success is due in part to the adoption and customization of ePub, the open eBook standard by the International Digital Publishing Platform (IDPF). The format provides a single format that publishers and conversion houses can use internally, as well as for distribution and sale. The ePub and other related formats, with their embedded metadata and single file packaging approach, have proven to be very good solutions enabling users to read documents off-line as long as the documents are first entirely downloaded to a local cache before being made available to eReading Applications.

The emergence of HTML5 based platforms is now offering an alternate system and method for the distribution, protection and consumption of copyrighted documents. Most noticeably, where other document formats, such as ePub or PDF for example, require the entire document to be downloaded and extracted before being made available to proprietary eReading applications, HTML5 based platforms only need to download individual pages or blocks of pages of a document, thus defining a flexible and dynamic model to the otherwise traditional monolithic content distribution and consumption model. However, as new content layers and HTML5 based services are progressively merged into enhanced reading user experience, it is increasingly difficult to encapsulate these additional layers into a single file packaging model, regardless of its format. Most noticeably, as what constitutes a document is shifting from a static model (original document content only) to a more dynamic model (original document augmented by related and personalized content), it becomes very important for the HTML5 reading systems to enable a reading device to effectively process the document and its associated content.

SUMMARY

As such, embodiments of the invention enable an education digital reading platform to provide marker data to a client device. The marker data provides an indication of the processing capabilities that would be required on a client device to display the contents of page requested by the user and additional content layers associated with the page. Additional content layers include, for example, related content data, user generated content data, advertisement content data, service and reserved content data associated with other services offered by the education digital reading platform. Additionally, the education digital reading platform provides delta markers providing a difference in the processing capability required to display data from one page to the next. The delta markers are provided ahead of a user's request for additional pages. As such, the education digital reading platform enables a client device to request additional resources if a next anticipated page requested by the user will require more processing power or it enables the digital reading education platform to provide one or more fewer content layers if the client device does not have the processing capabilities to provide a seamless user experience while displaying the requested content.

Embodiments of the invention provide a computer-implemented method of providing characterizations of content layers associated with a markup language document, wherein the method comprises accessing deconstructed data for the markup language document. The deconstructed data may comprise a data structure and page information associated with the markup language document. The method also provides creating page markers based on the deconstructed data, wherein the page markers characterize the complexity of page information in terms of memory resources to display the page based on its data structure and page information. The method provides the created markers to a web browser application requesting a page of the markup language document. The markers enable the web browser application to manage content fetch requests based on the created markers.

Embodiments of the invention also include a computer program product with instructions for providing characterizations of content layers associated with a markup language document, wherein the instructions comprises accessing deconstructed data for the markup language document. The deconstructed data may comprise a data structure and page information associated with the markup language document. The instructions also provides creating page markers based on the deconstructed data, wherein the page markers characterize the complexity of page information in terms of memory resources to display the page based on its data structure and page information. The instructions provide the created markers to a web browser application requesting a page of the markup language document. The markers enable the web browser application to manage content fetch requests based on the created markers.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

FIG. 6 is a diagram illustrating a process for characterizing user generated content in an HTML5 document in accordance with an embodiment of the invention.

FIG. 7 is a diagram illustrating a process for characterizing advertisement content in an HTML5 document in accordance with an embodiment of the invention.

One skilled in the art will readily recognize from the following discussion that alternative embodiments of the structures and methods illustrated herein may be employed without departing from the principles of the invention described herein.

DETAILED DESCRIPTION OF THE EMBODIMENTS

System Overview

Embodiments of the invention enable an education digital reading platform to provide a characterization of content in and associated with a document. The characterizations may be used by a client device to effectively present the document and its associated content to a user for a user to interact with an HTML5 document displayed on a web browser application executing on a computing device such as a computer, a tablet computer, an ereading device, a mobile phone, etc. Since HTML5 documents enable a user to read a page of a document without downloading the entire document, an eReading application executing on a client device often does not know how the application resources and the client device resources will be taxed with each successive page requested by the user. Embodiments described herein enable such applications and client devices to interact with a server providing HTML5 documents to manage and anticipate the amount of content likely to be requested by a user.

Figure 1:
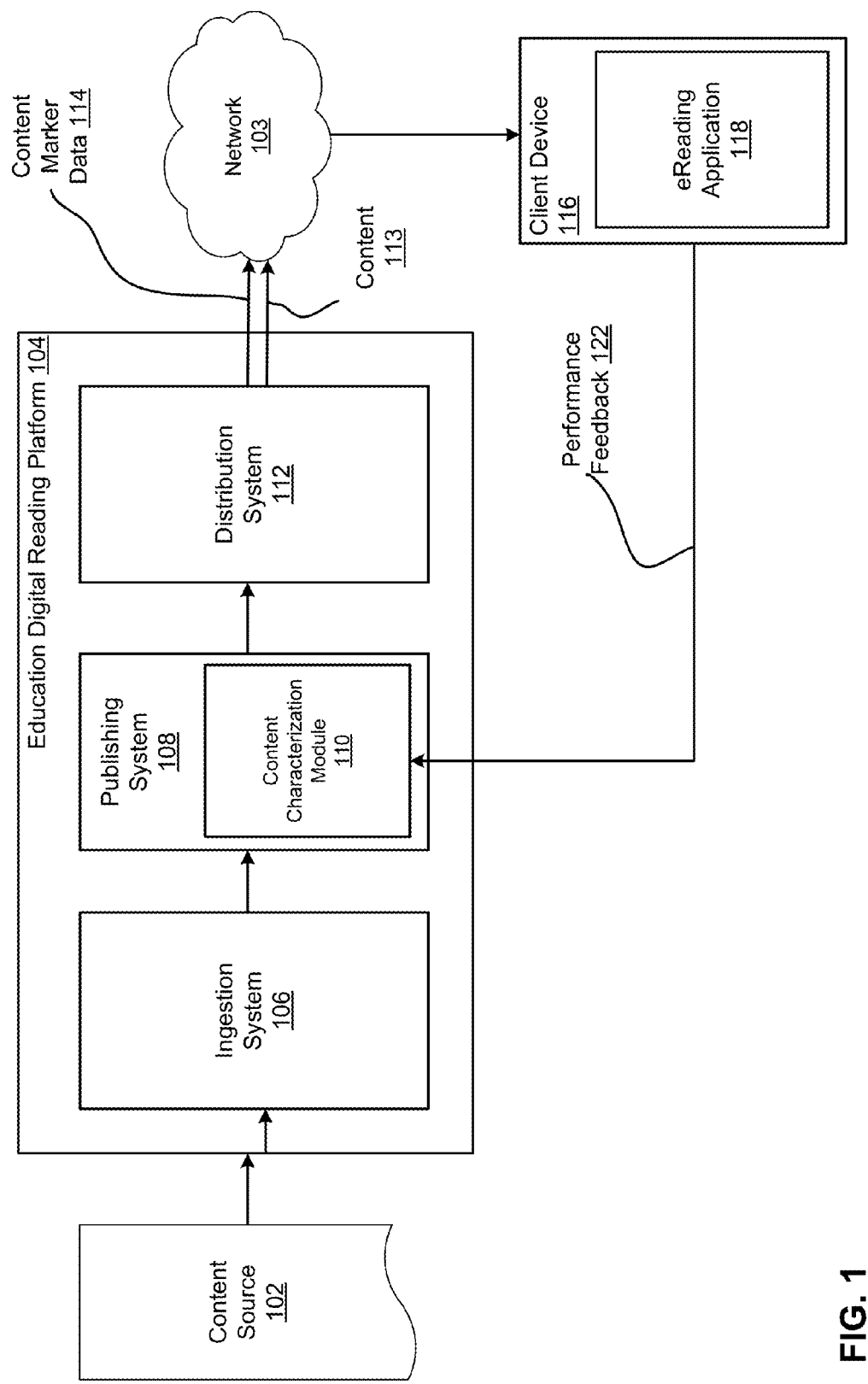
FIG. 1 illustrates a block diagram of a computing system enabled to provide content marker data associated with an HTML5 document to a client device in accordance with an embodiment of the invention.

FIG. 1 illustrates a block diagram of a system environment for a digital content delivery and online education services in accordance with an embodiment of the invention. The system environment facilitates flexible distributions of digital documents from publishers to end users.

As shown in FIG. 1, the digital reading environment comprises a content source 102, an education digital reading platform 104, a network 103, and one or more client devices 116. At a high level, the education digital reading platform 104 ingests content from a content source 102, characterizes it and distributes it to client devices 116 requesting the content 113 over a network 103. In addition to the content 113, the education digital reading platform 104 sends content marker data 114 characterizing the content requested by and adjacent to or within a few pages of a page within the content requested by the client device 116. The client device displays the requested content to a user via a web browser application (also referred to as an eReading application) 118 and in one embodiment, sends performance feedback data 122 to the education digital reading platform 104, wherein the subsequently sent content may be adjusted based on the client device's performance. In another embodiment, the client device 116 request particular content over another from the education digital reading platform 104, wherein the sent content is adjusted based on the client device's request.

The content source 102 includes any digital and printed content; it may be gathered and aggregated from any number of publishers, users, categories, and partners. Examples of a document 102 include textbooks, trade books, magazines, newspapers, user-generated content, web content, advertising content, social networking content, etc.

The education digital reading platform 104 comprises an ingestion system 106, a publishing system 108 including a content characterization module 110 and a distribution system 112. The education digital reading platform 104 is described in more detail in patent application U.S. Ser. No. 13/253,011 titled "Electronic Content Management and Delivery Platform" filed on 4 Oct. 2011, the disclosure of which is incorporated herein by reference in its entirety.

The ingestion system 106 first gathers information on the type, file formats, and file manifest of the content. The ingestion system collects the content into a formalized staging environment for further processing by the platform 104.

The publishing system 108 converts ingested documents into markup language documents, for example, an HTML5 web page which is well-suited to distribution across a wide variety of computing devices connected to the education digital reading platform 104 via the network 103. In addition to converting ingested data, the publishing system 108 identifies additional content that can be displayed with the converted document and adds the additional content as layers to the converted content. Examples of additional content include, but are not limited to user generated content, related content such as charts, tables, websites or references that may clarify or add to the content of the document, advertisement content, social networking content, etc.

The content characterization module 110 characterizes the content ingested by the ingestion system 106 and converted by the publishing system 108 as well as additional content layers associated with the document. In one embodiment, the content characterization module 110 characterizes the size of the converted content as well its associated content. In another embodiment, the content characterization module 110 characterizes the system resources that would be required to the display content and the additional content layers. The content characterization module 110 is described in greater detail in reference to FIG. 3.

The distribution system 112 packages the content for delivery and uploads the content to content distribution networks. Then, the distribution system 112 makes the content available to end-users based on the content's digital rights management policies.

The network 103 facilitates content and service distribution and communications between various components of the system environment. Contents are packaged and distributed across the network 103 for client consumption. The overall quality of service received by the clients is also monitored and reported back to the platform 104 over the network 103. The network 103 is typically a content delivery network (CDN) built on the Internet, but may include any network, including but not limited to a LAN, a MAN, a WAN, a mobile wired or wireless network, a private network, or a virtual private network.

The client devices 116 access the content from web browser applications 118 such as web browsers executing on the client device 116 and connected to the network 103. The client devices 116 include a personal computer, such as a desktop, laptop, or tablet computer, a personal digital assistant, a mobile or smart phone, or a television "set-top box" using a client web application. The web browser application 118 is an application executing on the client device 116 and is typically used for retrieving and presenting resources accessed over a network. In one embodiment, the web browser application 118 is displaying a web page retrieved from a web server via a network. Examples of the web browser application 118 include, for example, GOOGLE CHROME, MOZILLA FIREFOX, APPLE SAFARI, and MICROSOFT INTERNET EXPLORER. A characteristic of web browser applications 118 is that they have limited access to computing resources of the client device 116. In addition, the web browser application 118 typically also has limited resources itself. However, the web browser application 118 may request additional resources from the client device 116 or may make more resources available as necessary. Similarly, the web browser application 118 may also reserve resources for a particular document or a page if a request of additional resources is anticipated.

As the users of the client devices 116 enjoy the requested content and the additional layers of content associated with the requested content, the demands on a web browsers application 118 may vary dramatically from one page to another. For example, one page of a document may contain no additional layers of content, while another page may contain several layers, wherein one layer includes several videos that tax resources heavily. To provide a consistent reading and interacting experience to users, the education digital reading platform 104 provides content marker data 114 to the client device notifying that client device 116 and the web browser application 118 about the additional layers of content associated with the requested content. For example, if a user requests a page of a document, the education digital reading platform 104 provides the requested page content as well as content marker data 114 which provides an amount of additional content layers associated with the requested page, the amount of additional content layers associated with pages adjacent to or near the requested page and a delta between each successive page. The client device 116 and the web browser application 118 may reserve system resources to accommodate additional or fewer content layers in the anticipated next pages of the document.

The client device 116 and the web browser application 118 may also report performance feedback data 122 to the education digital reading platform 104 indicating whether there are enough resources to display the content layers in the anticipated next page requests. Although not illustrated as such in FIG. 1, the performance feedback data 122 is sent to the education digital reading platform 104 over a network 103. The education digital reading platform 104 may send fewer or additional content layers to the client device 116 if the performance feedback data 122 suggests that the client device 116 and the web browser application 118 cannot display one or more portions of the additional content layers.

Figure 2:
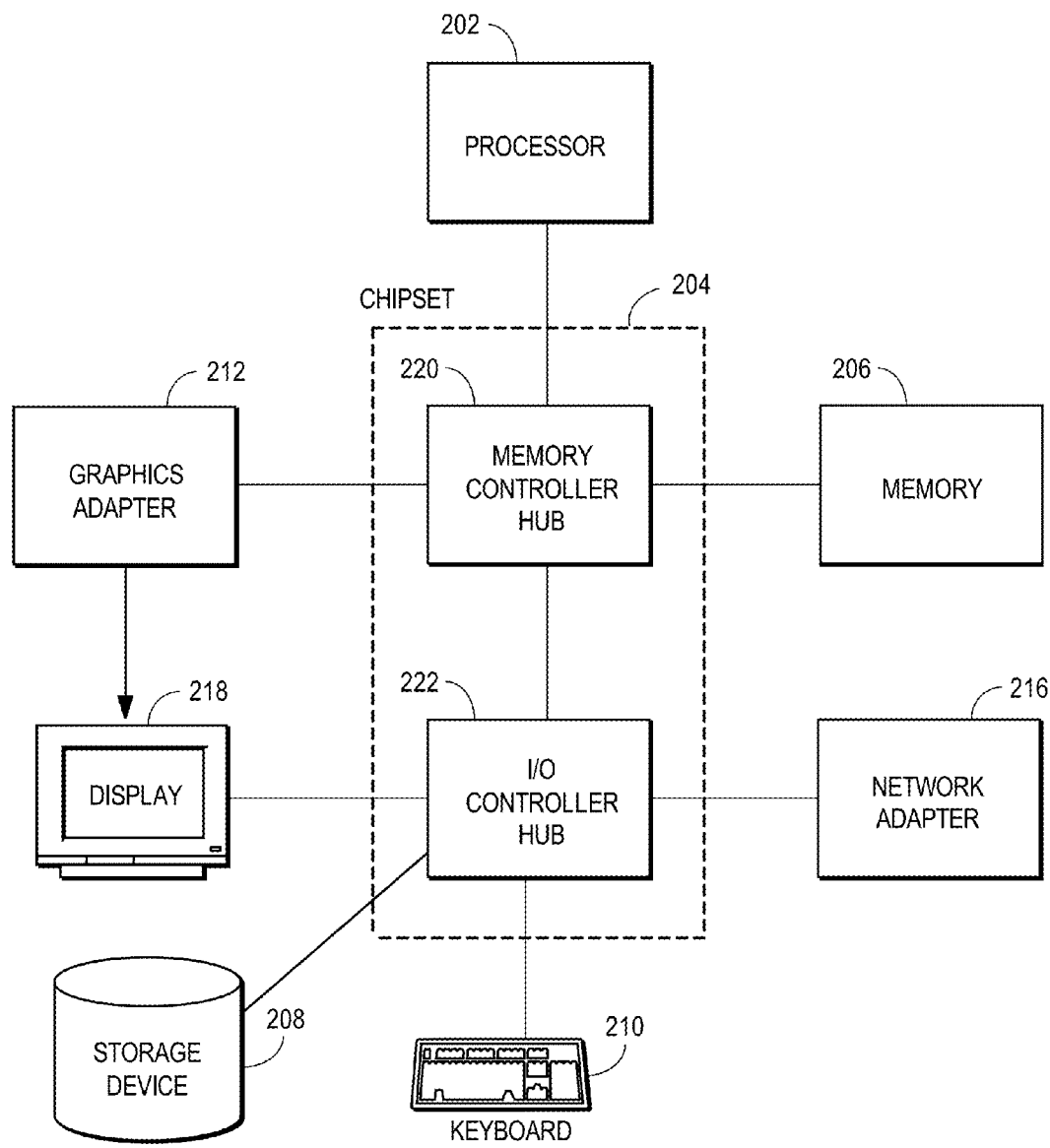
FIG. 2 is a block diagram illustrating an example computing device in accordance with an embodiment of the invention.

FIG. 2 is a high-level block diagram illustrating an example of a client device 116 according to one embodiment of the present disclosure. Illustrated are at least one processor 202 coupled to a chipset 204. The chipset 204 includes a memory controller hub 250 and an input/output (I/O) controller hub 255. A memory 206 and a graphics adapter 213 are coupled to the memory controller hub 250, and a display device 218 is coupled to the graphics adapter 213 and the I/O controller hub 255. A storage device 208, keyboard 210, and network adapter 216 are also coupled to the I/O controller hub 255. Other embodiments of the client device 116 have different architectures.

The storage device 208 is a non-transitory computer-readable storage medium such as a hard drive, compact disk read-only memory (CD-ROM), DVD, or a solid-state memory device. The memory 206 holds instructions and data used by the processor 202. In some embodiments, the display device 218 is a touch-sensitive display. The display device 218 can be used alone or in combination with the keyboard to input data to the client device 116. The graphics adapter 213 displays images and other information on the display device 218. The network adapter 216 couples the client device 116 to a network. Some embodiments of the client device 116 have different and/or other components than those shown in FIG. 2.

The client device 116 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

System for Characterizing Content

Figure 3:
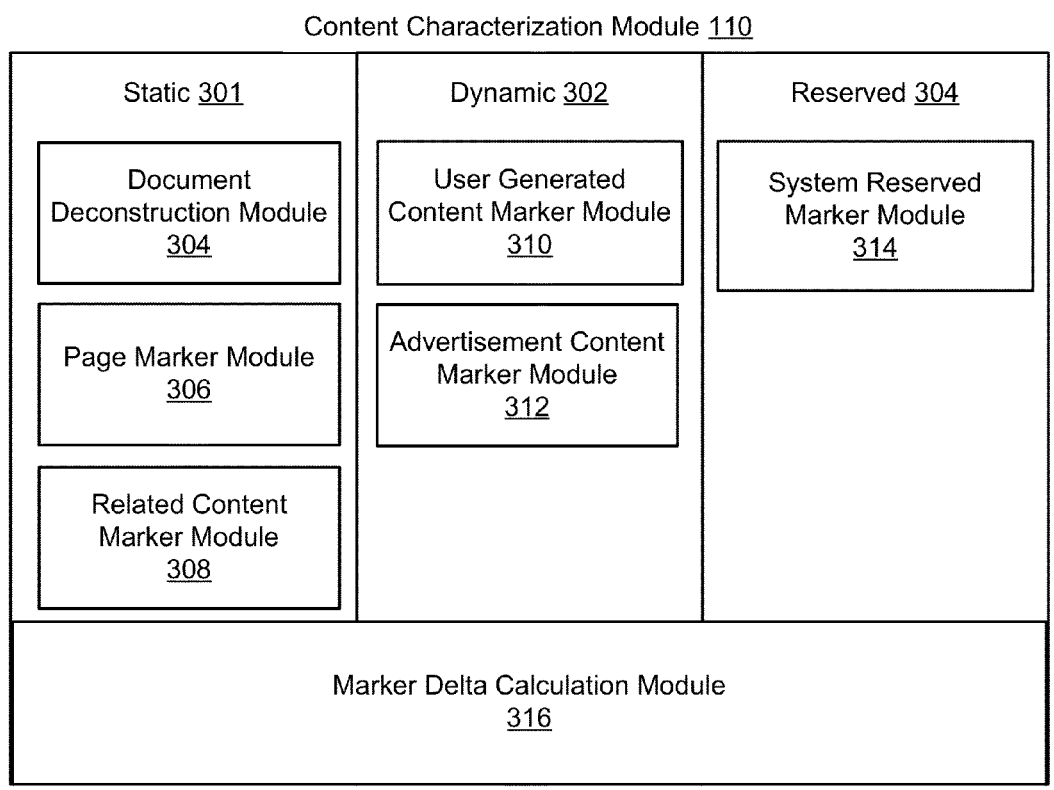
FIG. 3 is a block diagram illustrating modules within a content characterization module in accordance with an embodiment of the invention.

FIG. 3 illustrates a content characterization module 110 characterizing one or more content layers associated with a page of a document requested by the user. The content characterization module 110 includes static 301, dynamic 302 and reserved 304 types of modules. The static 301 type of data is constant during a user session but may be updated between user sessions. The dynamic 302 type of data can be updated during a user session. The reserved 304 type of data may be either static or dynamic depending on the implementation.

The static 301 type includes a document deconstruction module 304, a page marker module 306, and a related content marker module 308. The document deconstruction module 304, extracts metadata by deconstructing documents into basic elements of information. A partial list of document specific metadata includes, for example, sizes of images, types of images (such as graphs, tables, and pictures), locations, captions, number and size of columns, paragraphs, type of layout, embedded references, partial and full content indexing, border size, blank pages, and many others. Collectively, these document specific metadata are referred to herein as page marker data or as document structure metadata. Page marker data identifies the location and composition of elements of information that make up a printed document. For example, the page marker data can identify the part of the document, such as title, subtitle, chapter, caption, image, sample questions, and the like, as well as where it is located within the printed document page.

The page marker module 306 characterizes a deconstructed HTML5 document by employing a weighting process. The page marker module 306 identifies the structure of the document to be analyzed, including number of pages and document metadata such as types of fonts and images and represents this information in a mathematical representation of a file size estimate for all the elements needed to describe a page of the document. The marker is a number, or a set of numbers used to represent the various page elements of the document structure. In one embodiment, the page marker module 306 identifies page markers for each page in the document.

Generally, fonts represent a large percentage of the file size of a complex document; therefore, the page marker module 306 identifies font type and family being used in each page of the document. The font information is used to minimize repetitive downloads on a client device 116 across multiple pages using the same font types. Consolidating font type and family result in optimizing the aggregated downloadable HTML5 file size across adjacent pages, or sections, of a document. In that context, the font markers may also be used as pointers or references to the font types being used across various pages in a document.

Similarly, images may represent a large percentage of a file size of a complex document; the page marker module 304 also identifies images being used per individual pages in order to minimize the repetitive download across multiple pages on a client device 116, wherein the various pages use the same images. As such, the page marker module 304 may identify images that are common to two or more pages in a document. A common image may include, for example, a logo, a single black or white pixel, etc., wherein the common image can be re-used many times instead of being associated with a single page. Also, the page marker module 304 may flag an image for conversion from a bitmap to a vector representation if it is determined to be more efficient. The page marker module may also identify individual but repetitive graphic objects which can be the target of more complex transformations, such as a single pixel from which a line of data can be built.

The related content marker module 308 characterizes the size of content related to the document. As described in reference to FIG. 1, the related content associated with a document is identified by the education digital reading platform 104. Although the related content is not part of an original document, it may be characterized as a layer of content associated with a document. The education digital reading platform 104 provides related content associated with or mapped to each page of a document. Once mapped, the related content marker module 308 creates a marker to identify its weight within the associated page. The related content marker module 308 assigns weight to related content on each page of the document.

The dynamic 302 type includes a user generated content marker module 310 and an advertisement content marker module 312. The user generated content marker module 310 is dynamic 302 in that it may be updated during a user session. As a document is rendered by a web browser application 118, a new layer of content gets created as soon as users start to interact with that document. This new content is defined user generated content (UGC) and is linked to pages within the document wherein the user generates the UGC. As UGC content is rendered alongside its associated HTML5 pages, UGC is categorized as a supplemental content layer to the original document and the user generated content marker module 310 calculates the weight of the UGC content layer associated with each page of the document. In one embodiment, because UGC content may be updated during a user session, the user generated content marker module 310 makes a distinction between new and edited UGC. The user generated content marker module 310 identifies new UGC within pages of a document and calculates its weight. Additionally, the user generated content marker module 310 adds the new UGC's weight to the previously identified or already existing UGC's weight to identify the weight of UGC within pages of a document.

The advertisement content marker module 312 is also dynamic 302 in that it may be updated during a user session. Advertisements may be delivered to a user reading an HTML5 page and may be considered another supplement content layer to the original document. The content marker module 312 creates markers characterizing a weight of advertisement content layer associated with each page of a document. The advertisements may be selected by the education digital reading platform 104 based on the content the user is requesting, the user's needs, profile, etc. As the content being read by the user changes, or the user's needs changes over a course of a user session, the advertisement content marker module 312 identifies new or different advertisements to be delivered to the user one or more times during a session. As such, the advertisement content marker module 312 calculates a weight of the advertisements to be delivered to the user.

The reserved 304 type includes a system reserved marker module 314. Although page markers have been described so far in relation to specific content, markers can also be used to reserve system resources for content that might be either already downloaded or coming from alternate sources. For instance, when dealing with UGC or advertisement layers, markers can be defined as a mechanism to request specific resources within web browser applications to ensure that pages are properly characterized even if the content for that page is not entirely downloaded. As an example, a page that includes a quiz can be characterized by a marker which is going to request the estimated resource needed to load and run that quiz, or an updated version of that quiz, even if that quiz is actually not loaded initially.

Similarly, markers can be defined as a way to preemptively request resources across multiple pages of a document for reading activities that are anticipated to happen but have not happened yet. For instance, reserving resource for notes creation, user's social interactions with other users or social networking data, or other service specific features can be estimated through the creation of service-centric page markers used preemptively by web browser applications to normalize user experience. Such potential usage of services may be characterized as another content layer associated with a document. The system reserved marker module 314 creates markers characterizing a weight of the services content layer for each page in a document and associates the marker with the respective page.

Lastly, the marker delta calculation module 316 may be considered static 301, dynamic 302 or reserved 304 type of module. The marker delta calculation module 316 calculates a change in markers from one page to the next within a document. Because document pages may not be equivalent, the marker delta calculation module 316 calculates a delta between consecutive pages of a single document. It is the delta characterization that is valuable to web browser applications because it enables them to proactively manage the available resources and optimize user experience ahead of actually downloading any pages requested by the user.

Figure 4:
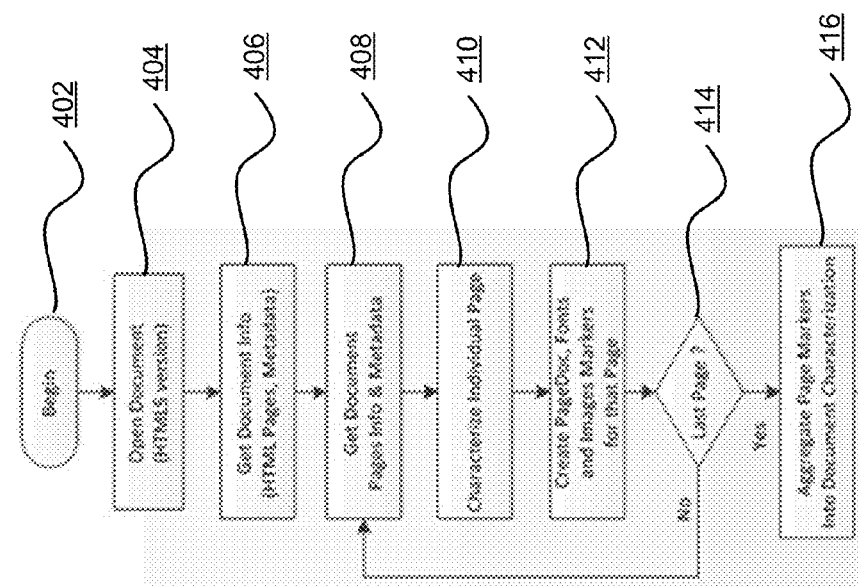
FIG. 4 is a diagram illustrating a process for characterizing page content in an HTML5 document in accordance with an embodiment of the invention.

FIG. 4 illustrates a process for calculating page markers associated with pages of a document. The process begins 402 by opening 404 an HTML5 document ingested by the ingestion system 106 of the education digital reading platform 104. Based on the ingested information, the process gets 406 document information of the document. Document information may comprise, for example, identifying a number of pages of the document, etc. The process continues by getting 408 document page information and metadata, comprising, for example, content of the document, such as a topic covered by the document, fonts used to display content within the document, images displayed in the document, etc. The process continues by characterizing 410 the document page information and its metadata. The characterization may include, for example, the weight of the each fonts and images used within the pages of the document. The process creates 412 page makers for each individual page. The page markers characterize the weight of the fonts, text, images, etc within individual pages of the document. The process continues iteratively to get 408 document page information and metadata for each page until the last page 414 is reached. Once the last page 414 is reached, the process aggregates 416 page markers into document characterization. The aggregation process removes redundant font information, image information that would not have to be loaded from one page to another. Therefore, the page markers for each individual page characterize the amount of data that would have to be loaded from one page to the next.

Figure 5:
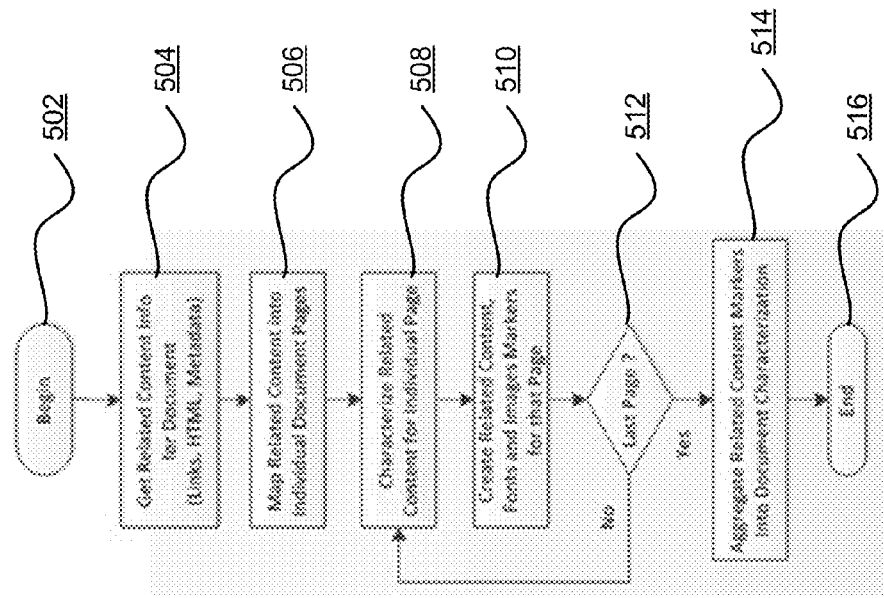
FIG. 5 is a diagram illustrating a process for characterizing related content in an HTML5 document in accordance with an embodiment of the invention.

FIG. 5 illustrates a process for calculating related content markers associated with each page of a document. In one embodiment, the process begins 502 by getting 504 content related to a document. The related content may comprise links, HTML content, metadata, videos, etc. Further, the process maps 506 the related content to individual pages of the document such that related content is associated with the page wherein it is to be displayed. The process characterizes 508 related content for each individual page by identifying the fonts, images, etc. used to display the related content and process it at the client device. The process creates 510 related content markers characterizing the weight of the related content, its fonts, images, etc., such that a client device can determine an amount of resources likely needed to display and process the related content. The process continues iteratively to characterize 508 related content for each page of the document until the last page 512 is reached. Once the last page is reached, the process 514 aggregates related content markers into related content characterization markers. The aggregation process removes redundant information that would not have to be loaded from one page to another, such as fonts or images that repeat from one page to another. Therefore, the related content markers for each individual page characterize the amount of data that would have to be loaded from one page to the next. The process ends 516 once the related content markers for each page are created.

FIG. 6 illustrates a process for calculating UGC markers associated with each page of a document. As described in reference to FIG. 3, UGC content includes any content that a user provides associated with the document. Examples of UGC, include but are not limited to, notes, underline, highlights, etc., made on the document. The process begins 602 by opening 604 a user account and identifying if there is new UGC 606. If there is new UGC, the process gets 608 the new UGC content from the user and gets 610 latest user document information. User document information may include any document information identified by the ingestion and publishing system of the education digital reading platform. The process maps 612 the UGC content to the user document. The mapping may comprise associating each UGC with the document. Further, the process maps 614 UGC content to pages of the user document. Mapping herein may comprise associating each UGC with a page of the document. The process also characterizes 616 the UGC on each page of the document, wherein the characterization may comprise identifying fonts, images, etc., of the UGC. Once characterized, the process creates 618 UGC markers for a page of the document. The process continues iteratively to map 614 UGC content to document pages, characterize 616 UGC on the individual page and create 618 a UGC marker for that page until the last page 620 is reached. Once the last page is reached, the process aggregates 622 UGC markers into updated user document information. The aggregation process eliminates redundant information that would not have to be loaded from one page to another, including but not limited to, fonts and images that repeat from one page to another. Therefore, the UGC content markers for each page characterize the amount of data that would have to be loaded from one page to the next. In one embodiment, the process runs one or more times during a session. As such the process captures new UGC throughout a user's session. If no new UGC 606 is detected, the process ends 624.

FIG. 7 illustrates as process for calculating advertisement content markers associated with each page of the document. Advertisements are often served by the digital education reading platform and are characterized as an additional content layer associated with a document. In one embodiment, the process begins 702 by opening 704 a user account and getting 706 user document information. The user document information is a document requested and displayed to a user on a client device. The process gets 708 user advertising manifest from the education digital reading platform. As described in FIG. 3, the advertisement manifest may include advertisements to display to the user based on the user's preferences, the content requested by the user, anticipated user needs and targeting criteria provided by an advertiser. The process gets 710 advertising content as provided by the manifest and maps 712 the advertising content to the user document pages. Thereafter, the process characterizes 714 ads on each individual page of the document. The characterization process may comprise of identifying fonts, images, etc., displayed in the advertisement. Based on the characterization, the process creates 716 an ads marker for that page. The page markers characterizing the weight or the processing capability required to display the advertisement to a user in a web browser application. The process continues iteratively to map 712 advertising content to user document pages for each page of the document, characterize 714 ads on each individual page, and create 716 an ads marker for the page until the last page 718 is reached. Once the last page 718 is reached, the process aggregates 720 advertising content markers into the user document information, wherein the aggregation process removes redundant information that would not have to be loaded from one page to another, such as fonts or images that repeat from one page to another. Therefore, the advertisement content markers for each individual page characterize the amount of data that would have to be loaded from one page to the next. The process ends 722 after the aggregation process.

Figure 8:
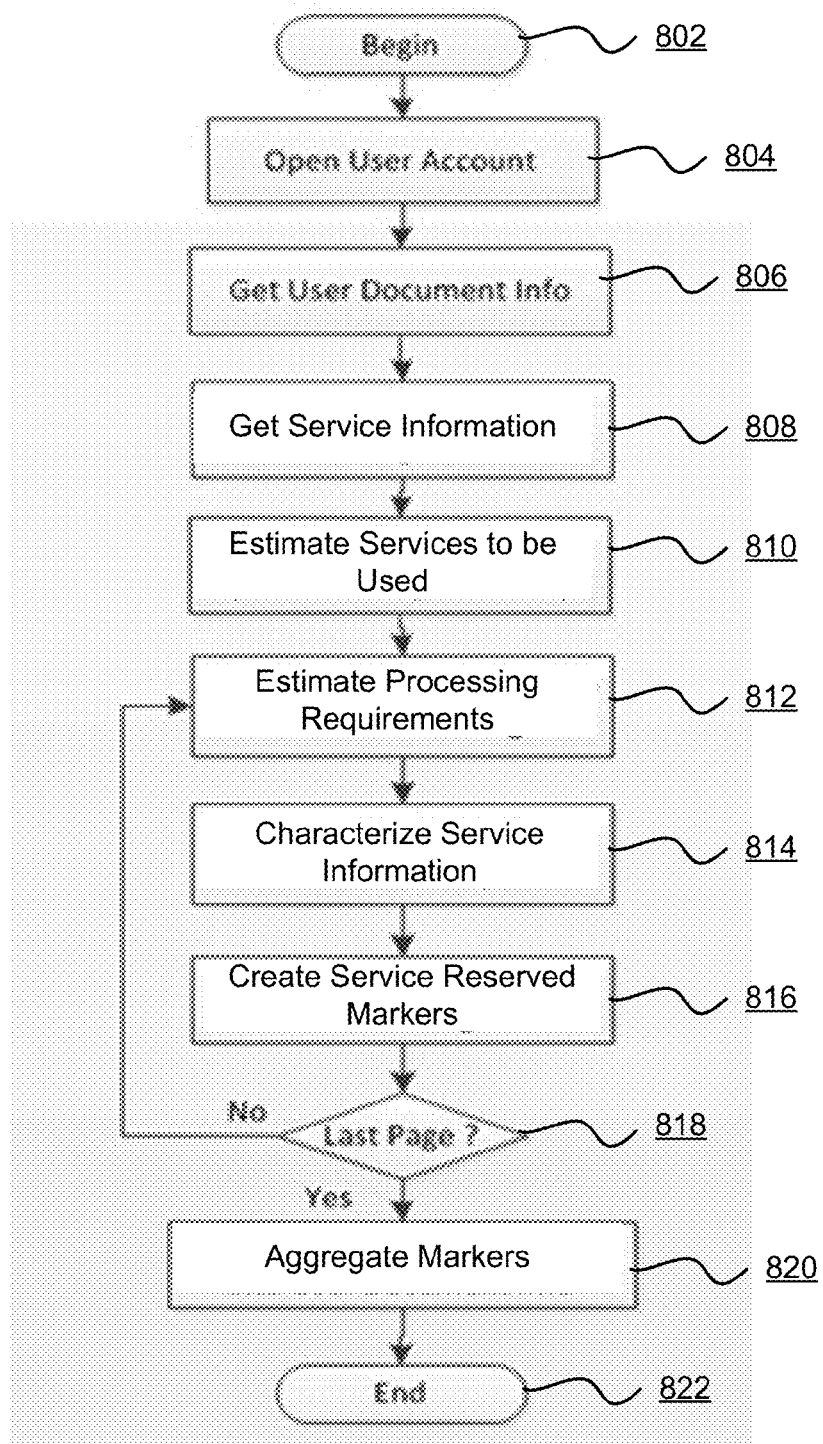
FIG. 8 is a diagram illustrating a process for characterizing social networking and reserved content in an HTML5 document in accordance with an embodiment of the invention.

FIG. 8 illustrates a process for calculating system reserved markers associated with each page of the document. The digital education reading platform may provide several services to its users, including for example, interactive services enabling users to interact with each other, social networking services enabling users to form social networking groups and share content among the groups, etc. Often, it is unclear whether a user will choose to use one or more of these services when viewing a document on a client device. The system reserved markers provide an indication of processing power or capability required to provide such services if the user decides to the use the service.

In one embodiment, the process begins 802 by opening 804 a user account and getting 806 user document information. The user document information is a document requested by and displayed to a user on a client device. The process gets 808 service information from the education digital reading platform. The service information includes services that may be provided on the document requested by the user. As described in the specification above, services may include interactive messaging services, social networking services, etc. In addition, the process estimates 810 the services likely to be used by a user based on the user's usage history. The usage history can be retrieved from the user account. The process estimates 812 the complexity and processing power required to execute one or more of the services. Thereafter, the process characterizes 814 services likely to be used on each individual page of the document. The characterization process may comprise of identifying fonts, images, video streams etc., associated with the various services. Based on the characterization, the process creates 816 a system reserved marker for that page. The page markers characterizing the weight or the processing capability required to provide services to a user in a web browser application. The process continues iteratively to characterize services 810 for each page of the document, characterize 812 services likely to be used by a user on each individual page, and create 816 a system reserved marker for the page until the last page 818 is reached. Once the last page 818 is reached, the process aggregates 820 advertising content markers into the user document information, wherein the aggregation process removes redundant information that would not have to be loaded from one page to another, such as fonts or images that repeat from one page to another. Therefore, the system reserved markers for each individual page characterize the amount of data that would have to be loaded from one page to the next. The process ends 822 after the aggregation process.

Figure 9:
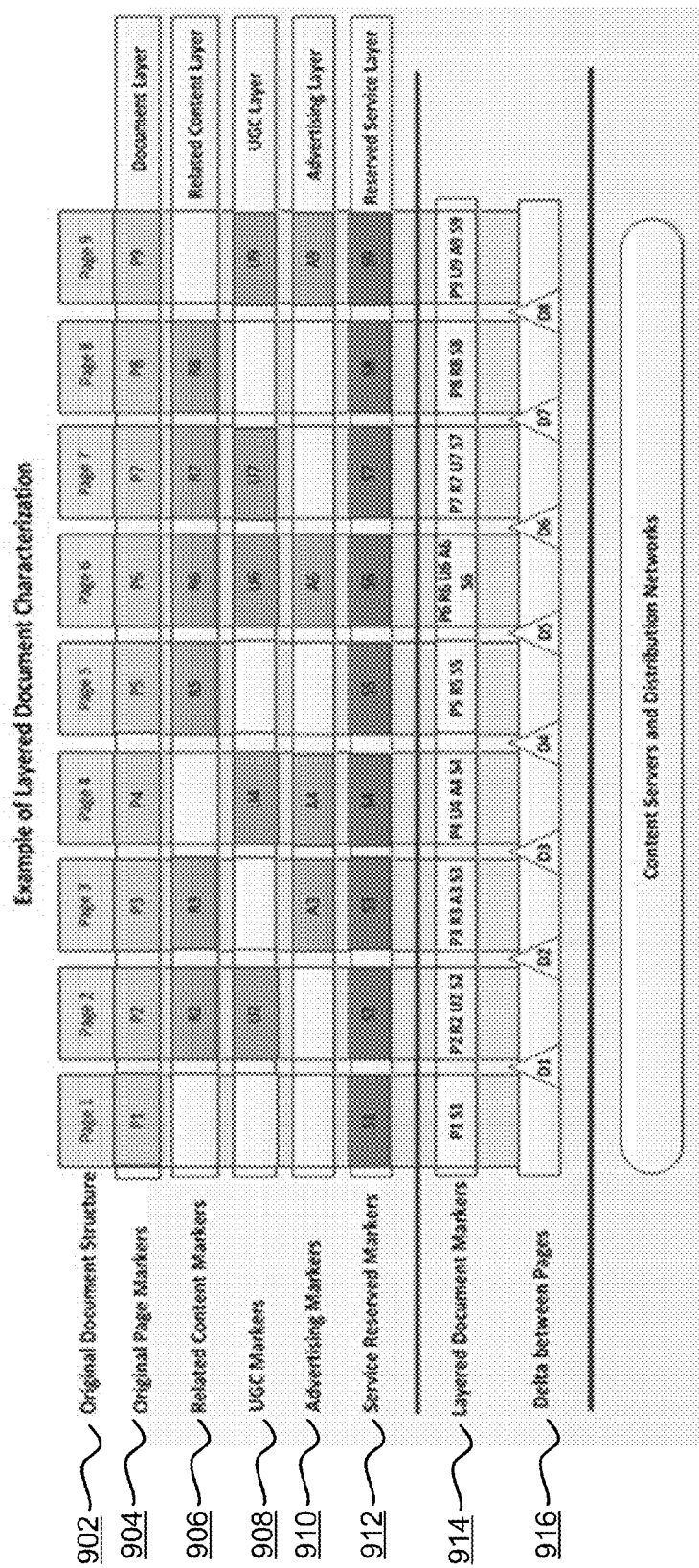
FIG. 9 is a diagram illustrating a page markers characterizing content associated with an HTML5 document in accordance with an embodiment of the invention.

FIG. 9 illustrates an example of layered document characterization in accordance with an embodiment of the invention. It illustrates pages of an original document (Page 1, Page 2, Page 3, etc.) from the original document structure 902, its associated original page markers 904, related content markers 906, UGC markers 908, advertising markers 910, system reserved markers 912, layered document markers 914, and delta between page markers 916. The original page markers 904, as described in reference to FIGS. 3 and 4 provide a weight or processing power required to load the contents of the page on a client device. The related content markers 906, as described in reference to FIGS. 3 and 5 provide a weight or processing power required to load the related content associated with a page on a client device. Similarly, the UGC markers 908, the advertising makers 910 and system reserved markers 912 provide the weight or processing power required to the load the UGC content, advertising content and system reserved content, respectively on each page of the document.

The layered document markers 914 represent the total weight or processing capability required to display each content layer associated with a page of the document. The layered document markers 914 may be calculated by aggregating or adding all the layered content markers on a page. The delta between pages 916 represents the change in weight or processing power required to display content layers from one page to its adjacent page. The delta enables a browser application 118 to get comprehensive information of the document requested by a user ahead of actually fetching the pages of that document. Document characterization via delta markers complements the browser characterization that eReading applications are performing to optimize user experience parameters.

Additional Configuration Considerations

The present invention has been described in particular detail with respect to several possible embodiments. Those of skill in the art will appreciate that the invention may be practiced in other embodiments. The particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not limited to any particular programming language. It is appreciated that a variety of programming languages may be used to implement the teachings of the present invention as described herein, and any references to specific languages, such as HTML5, are provided for enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A computer-implemented method of providing characterizations of content layers associated with a markup language document, the method comprising:

accessing deconstructed data for the markup language document, the deconstructed data comprising data structure and page information of the markup language document;

creating page markers for each of a plurality of pages of the markup language document based on the data structure and page information, the page markers of a respective page characterizing a complexity of the page information that represents memory or processing resources to display the page;

generating based on the page markers, a plurality of delta markers indicating differences between the complexities of successive pages of the markup language document;

providing the delta markers to a web browser application requesting a first page of the markup language document, the delta markers enabling the web browser application to manage resources for displaying a second page successive to the first page based on the difference between the complexity of the first page and the complexity of the second page;

receiving an identification of content related one or more pages of the markup language document;

identifying data structure and page information associated with the related content; and creating related content markers for the one or more pages of the markup language document based on the data structure and page information of the related content, the markers characterizing the complexity of the related content in terms of resources to display the related content;

wherein the delta markers are further generated based on the related content markers and further indicate differences between the complexities of the related content associated with successive pages of the markup language document.

2. The method of claim 1, wherein the data structure and page information comprises at least one of text, font and image information associated with pages of the markup language document.

3. The method of claim 1, wherein the related content comprises at least one of documents, webpages, images and videos associated with content in the one or more pages of the markup language document.

4. The method of claim 1, further comprising:

receiving user generated content associated with one or more pages of the markup language document, the user generated content created by a user of the markup language document and including data structure and page information associated with the user generated content; and creating user generated content markers for the one or more pages of the markup language document based on the data structure and page information of the user generated content, the user generated content marker characterizing the complexity of the user generated content in terms of resources to display the user generated content;

wherein the delta markers are further generated based on the user generated content markers and further indicate differences between the complexities of the user generated content associated with successive pages of the markup language document.

5. The method of claim 4, wherein the user generated content comprises at least one of notes, highlights and underlines made by users on the one or more pages of the markup language document.

6. The method of claim 1, further comprising:

receiving advertisement content associated with one or more pages of the markup language document, the advertisement content to be displayed within the one or more pages of the markup language document and including content structure and page information associated with the advertisement content; and creating advertisement content markers for the one or more pages of the markup language document based on the content structure and page information of the received advertisement content, the advertisement content markers characterizing the complexity of the advertisement content in terms of resources to display the advertisement content;

wherein the delta markers are further generated based on the advertisement content markers and further indicate differences between the complexities of the advertisement content associated with successive pages of the markup language document.

7. The method of claim 6, wherein the advertisement content comprises targeted advertisements received from an ad manifest, the ad manifest providing advertisements to be served within the one or more pages of the markup language document.

8. The method of claim 1, further comprising creating system reserved markers based on services that can be provided on a page of the document, the system reserved markers characterizing the complexity of service content that can be displayed with the markup language document, the service content providing at least one of interactive or social networking capabilities.

9. The method of claim 1, wherein each page of the markup language document is associated with one or more layers of content, the method further comprising:

receiving performance feedback data characterizing an amount of processing power available to the web browser application; and selecting based on the delta markers, one or more content layers associated with the first page of the document to send to the web browser application responsive to receiving the performance feedback data.

10. The method of claim 1, wherein the markup language document comprises an HTML5 document.

11. The method of claim 1, wherein the data structure and page information reconstruct the markup language page document with page fidelity to an original source document.

12. A non-transitory computer-readable storage medium storing executable computer program instructions for providing characterizations of content layers associated with a markup language document, the computer program instructions comprising instructions for:

accessing deconstructed data for the markup language document, the deconstructed data comprising data structure and page information of the markup language document;

creating page markers for each of a plurality of pages of the markup language document based on the data structure and page information, the page markers of a respective page characterizing a complexity of the page information that represents memory or processing resources to display the page;

generating based on the page markers, a plurality of delta markers indicating differences between the complexities of successive pages of the markup language document;

providing the delta markers to a web browser application requesting a first page of the markup language document, the delta markers enabling the web browser application to manage resources for displaying a second page successive to the first page based on the difference between the complexity of the first page and the complexity of the second page;

receiving an identification of content related one or more pages of the markup language document;

identifying data structure and page information associated with the related content; and creating related content markers for the one or more pages of the markup language document based on the data structure and page information of the related content, the markers characterizing the complexity of the related content in terms of resources to display the related content;

wherein the delta markers are further generated based on the related content markers and further indicate differences between the complexities of the related content associated with successive pages of the markup language document.

13. The non-transitory computer-readable medium of claim 12, wherein the data structure and page information comprises at least one of text, font and image information associated with pages of the markup language document.

14. The non-transitory computer-readable medium of claim 12, wherein the related content comprises at least one of documents, webpages, images and videos associated with content in the one or more pages of the markup language document.

15. The non-transitory computer-readable medium of claim 12, further comprising instructions for:
receiving user generated content associated with one or more pages of the markup language document, the user generated content created by a user of the markup language document and including data structure and page information associated with the user generated content; and
creating user generated content markers for the one or more pages of the markup language document based on the data structure and page information of the user generated content, the user generated content marker characterizing the complexity of the user generated content in terms of resources to display the user generated content;
wherein the delta markers are further generated based on the user generated content markers and further indicate differences between the complexities of the user generated content associated with successive pages of the markup language document.

16. The non-transitory computer-readable medium of claim 15, wherein the user generated content comprises at least one of notes, highlights and underlines made by users on the one or more pages of the markup language document.

17. The non-transitory computer-readable medium of claim 12, further comprising instructions for:
receiving advertisement content associated with one or more pages of the markup language document, the advertisement content to be displayed within the one or more pages of the markup language document and including content structure and page information associated with the advertisement content; and
creating advertisement content markers for the one or more pages of the markup language document based on the content structure and page information of the received advertisement content, the advertisement content markers characterizing the complexity of the advertisement content in terms of resources to display the advertisement content;
wherein the delta markers are further generated based on the advertisement content markers and further indicate differences between the complexities of the advertisement content associated with successive pages of the markup language document.

18. The non-transitory computer-readable medium of claim 17, wherein the advertisement content comprises targeted advertisements received from an ad manifest, the ad manifest providing advertisements to be served within the one or more pages of the markup language document.

19. The non-transitory computer-readable medium of claim 12, further comprising instructions for creating system reserved markers based on services that can be provided on a page of the document, the system reserved markers characterizing the complexity of service content that can be displayed with the markup language document, the service content providing at least one of interactive or social networking capabilities.

20. The non-transitory computer-readable medium of claim 12, wherein each page of the markup language document is associated with one or more layers of content, further comprising instructions for:
receiving performance feedback data characterizing an amount of processing power available to the web browser application; and
selecting based on the delta markers, one or more content layers associated with the first page of the document to send to the web browser application responsive to receiving the performance feedback data.

21. The non-transitory computer-readable medium of claim 12, wherein the markup language document comprises an HTML5 document.

* * * * *